United States Patent [19]

Oten

[11] Patent Number: 4,860,795
[45] Date of Patent: Aug. 29, 1989

[54] VENTURI BLOCK HAVING CUT OFF

[76] Inventor: Peter D. Oten, 1731 Harrow Ct., No. B, Wheaton, Ill. 60187

[21] Appl. No.: 163,794

[22] Filed: Mar. 3, 1988

[51] Int. Cl.[4] ............................................. F15D 1/02
[52] U.S. Cl. ........................................ 138/46; 138/43; 138/45; 137/892; 137/895; 239/318
[58] Field of Search .............. 138/40, 42, 43, 44, 138/45, 46; 137/892, 895, 142, 143, 502, 893, 894; 239/318

[56] References Cited

U.S. PATENT DOCUMENTS

| 2,541,464 | 2/1951 | Davies | 138/45 |
| 2,589,888 | 3/1952 | Stampfl | 138/45 |
| 2,936,788 | 5/1960 | Dahl et al. | 138/45 |
| 2,953,160 | 9/1960 | Brazier | 137/892 |
| 2,984,261 | 5/1961 | Kates | 138/46 |
| 3,111,091 | 11/1963 | Hopkinson | 138/45 |
| 3,257,180 | 6/1966 | King | 137/895 |
| 3,473,481 | 10/1969 | Brane | 137/895 |
| 3,613,997 | 10/1971 | Thompson | 239/318 |
| 4,361,166 | 11/1982 | Honaga et al. | 138/45 |
| 4,383,552 | 5/1983 | Baker | 138/46 |
| 4,527,595 | 7/1985 | Jorgensen et al. | 138/43 |
| 4,726,526 | 2/1988 | Ostergaard | 137/895 |

FOREIGN PATENT DOCUMENTS 647503 2/1979 U.S.S.R. ............................ 137/895

Primary Examiner—James E. Bryant, III
Attorney, Agent, or Firm—Donald J. Breh

[57] ABSTRACT

A vacuum venturi device including a bypass valve responsive to an increase in inlet pressure to divert pressurized gas to the low pressure port of the device to effect fast vacuum cut off and blow off.

20 Claims, 1 Drawing Sheet

VENTURI BLOCK HAVING CUT OFF

BACKGROUND OF THE INVENTION

This invention relates to a vacuum generator and more particularly to a vacuum generator of the type generally referred to as a venturi block, vacuum venturi or vacuum ejector. In still greater particularity, the invention relates to a venturi block including means for breaking the vacuum at the vacuum port thereof and providing for what is commonly referred to as blowoff.

Venturi blocks are well known and work on the well known vacuum venturi principle wherein a low pressure area can be formed by passing a pressurized gas, such as air, through a venturi nozzle, which low pressure area can be used to pull a vacuum on some work piece or tool to be operated. Vacuum venturi blocks are used in a wide variety of applications including, for example, material handling systems requiring vacuum pickup of articles such as by a vacuum cup. In such systems, the venturi block generates a vacuum which is applied to the vacuum operated tool, in this case a vacuum cup, to perform the desired function. When the function has been completed, it is necessary to discontinue the vacuum and in many applications, and in particular material handling and article transfer systems, fast, alternating application and breaking of the vacuum is required to effect fast and efficient operation of the system. If the vacuum is not broken and relieved quickly, the speed of operation will be significantly reduced.

Heretofore, when it has been required to break the vacuum generated by the vacuum block, an auxiliary pressurized gas system including external lines associated valving and controls has been utilized to apply an auxiliary pressurized gas, such as air, either to the exhaust port of the venturi block or directly to a line connecting the vacuum ports from the venturi block to the vacuum operated tool or device. In either case, the vacuum venturi effect is upset through the introduction of the auxiliary pressurized gas, thereby preventing generation of vacuum by the venturi and, depending on the pressure of the auxiliary gas supply, a positive pressure can be quickly applied to the tool or the device to effect positive blowoff. The positive pressure is particularly effective for quickly releasing the hold of a vacuum cup. Such auxiliary vacuum break or blowoff means are operationally effective but are not cost effective to implement for they require additional gas supply lines, regulators and controls for each tool operated. It can be seen, that in large systems, the additional hardware adds significantly to the cost, complexity and required maintenance of the system.

SUMMARY OF THE INVENTION

The present invention overcomes the shortcomings of the prior art in that there is provided a vacuum venturi block that significantly reduces the requirement for auxiliary controls to effect termination of vacuum and facilitate vacuum break or blowoff.

According to the invention, the venturi block includes means responsive to an increase in the pressure of the gas supply to the venturi inlet for raising the pressure at the vacuum port of the venturi block.

According to an important feature of the invention, a pressure responsive poppet is disposed in the venturi passageway which includes a portion forming a bypass valve which opens at a predetermined pressure of the supply gas above a normal operating pressure to divert at least a portion of the supply gas to the vacuum port of the venturi block.

According to another important feature of the invention, the poppet includes a central internal passageway defining a venturi nozzle.

A still further important feature of the invention provides for a compression spring supported against the poppet at one end and against an adjustment support member on an opposite end to bias the bypass valve toward a closed position.

Another important feature of the invention provides for a diffuser defining an exit portion of the venturi passageway.

A still further important feature of the invention provides for the low pressure area of the venturi passageway to be disposed in the passageway between the exit from the nozzle portion of the passageway in the poppet and the entrance to the exit portion of the passageway in the diffuser which low pressure area is connected to at least one vacuum port of the venturi block.

Yet another very important feature of the invention provides means for closing off the low pressure area of the venturi passageway from the vacuum port substantially simultaneously with the opening of the bypass valve.

A venturi shutoff valve is defined by the one end of the poppet at the exit from the nozzle and the end of the diffuser at the entrance into the passage therein.

According to a still further important feature, the nozzle exit end of the poppet and the entrance end of the diffuser which form the venturi shutoff valve are generally conically-shaped providing for sealing engagement therebetween when the poppet moves in a direction to open the bypass valve.

BRIEF DESCRIPTION OF THE DRAWINGS

The invention will be better understood after a reading of the following Detailed Description of the Preferred Embodiment in conjunction with the drawings in which.

DETAILED DESCRIPTION OF THE PREFERRED EMBODIMENT

Figure 1:
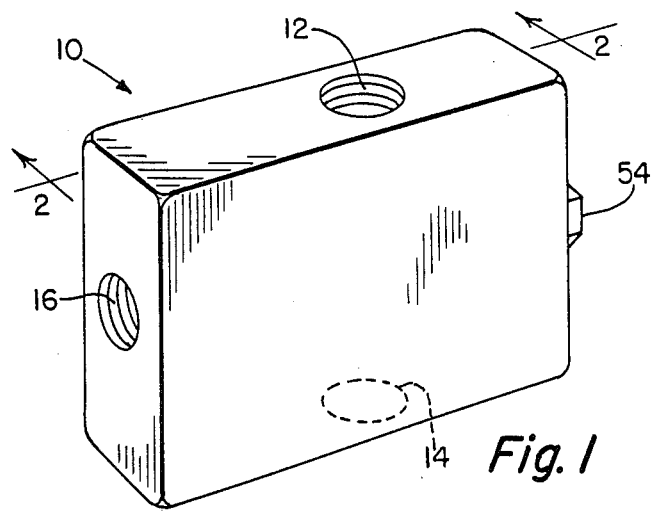
FIG. 1 is a perspective view of a venturi block according to the invention showing a gas supply inlet an exhaust port and two vacuum ports.
Figure 2:
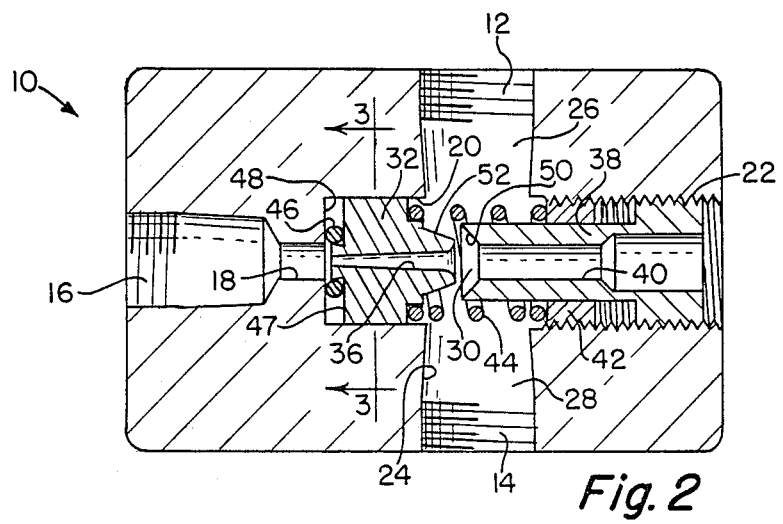
FIG. 2 is a vertical longitudinal cross sectional view of the venturi block of FIG. 1 showing details of construction.

Shown in FIG. 1 is a Venturi Block 10 made from, for example, aluminum and machined as shown in FIG. 2. The block shown includes two vacuum ports 12,14 however, it is to be understood that the block can have only one vacuum port if desired which depends on the particular application. Further, the block shown is a single stage venturi however, the invention is equally applicable to multiple stage venturies. The number of Venturi stages is also determined by the application.

Referring to FIG. 2, the venturi block includes a longitudinal passageway comprising an inlet port 16 and an inlet portion 18. An enlarged bore 20 connects coaxially to the inlet portion 18 and in the embodiment shown is threaded at 22. A cross-bore 24 intersects the bore 20 and forms two vacuum passages 26,28. As noted above, the cross-bore 24 need not extend through the entire block but, rather, may extend only as far as the bore 20 to form a single vacuum passage such as passage 26. The cross bore 24 intersects the longitudinal bore 20 preferably at the low pressure area 30 of the venturi.

Figure 3:
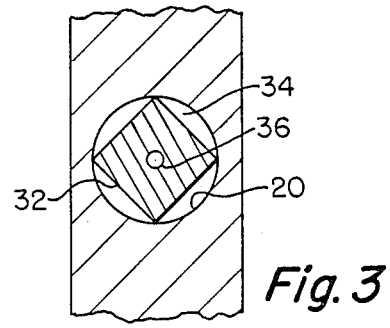
FIG. 3 is a partial cross sectional view through the poppet taken along the line 3-3 in FIG. 2 showing details of construction of the bypass valve portion of the poppet.

As shown in FIG. 3, a square-shaped poppet 32 is slidably disposed in the portion of the bore 20 between the cross-bore 24 and the inlet portion 18. As will be evident, the cross section of the poppet 32 need not be square but only needs to be any shape or design which forms or includes at least one passage, such as passage 34 in FIG. 3, connecting opposite ends of the poppet. For example, a cylindrical poppet having at least one axial through passage would be satisfactory. Those skilled in the art can readily design other poppet configurations and designs providing for interconnecting the two sides of the poppet. The poppet 32 includes a central through passage 36 defining a venturi nozzle exiting into the low pressure area 30. The nozzle passage shape can be for example cylindrical or tapered and of any cross sectional dimension desired to create a desired flow velocity which will generate the required pressure drop at area 30. Those skilled in vacuum venturi design and the venturi phenomenon can readily design an appropriate shape and size of the nozzle passageway to create a desired effect.

A diffuser 38 is threaded into the portion of the bore 20 on the side of the cross bore 24 opposite the poppet and is provided with a through bore 40 defining the exit portion of the venturi passageway. Preceding the diffuser 38 in the bore 20 is an adjustment member 42 which supports one end of a compression spring 44. The other end of the compression spring is supported on the poppet 32.

The poppet 32 includes a seal 46, in the form of an o-ring, on its inlet end face 47 surrounding the inlet 18 and which seals against the bore shoulder 48. The inlet end face of the poppet, the seal 46 and shoulder surface 48 define a pressure responsive bypass valve which is biased toward the closed position, as shown in FIG. 2, by the compression spring 44. The bias on the poppet 32 and thus the pressure required to move the poppet to open the bypass valve is adjusted through the positioning of adjustment member 42.

Still referring to FIG. 2, the end of the diffuser 38 at the entrance into the bore 40 therein is internally chamfered 50 and the end of the poppet 32 at the exit from the nozzle passageway 36 is conically tapered 52 thereby positioning the low pressure area 30 of the venturi between the chamfer and taper. The chamfered and tapered services define a venturi shutoff valve which closes substantially simultaneously as the bypass valve portion of the poppet opens when the poppet moves under increased pressure introduced into the inlet as described below.

During normal operation, compressed air of a predetermined normal operating pressure is introduced into the inlet 16. The normal operating pressure is below the pressure required to move the poppet 32 to the right, as viewed in FIG. 2, and is determined by the surface area of the inlet end face 47 and the opposing force exerted by the compression spring 44. With the poppet stationary and thus the bypass valve closed, the gas flows through the nozzle 36, expands into the area 30 creating a low pressure and exits out through the diffuser passage 40 and an exhaust port 54. A vacuum is thereby created and pulled through the vacuum passages 26,28 and ports 12,14 to operate the vacuum operated tool or device.

When vacuum is to be terminated and or blow off effected, an external pressurized gas supply is switched to introduce a gas into the inlet 16,18 which has a pressure greater than the normal operating pressure and which is sufficient to force the poppet 32 to the right, as viewed in FIG. 2, so as to open the bypass valve. Substantially simultaneously the tapered end 52 of the poppet engages in the chamfer 50 on the diffuser closing the venturi shutoff valve. Accordingly, the venturi effect is upset resulting in discontinuance of vacuum generation. Also, since the bypass valve is open, pressurized air passes through the axial bypass passage 34 past the poppet into the low pressure area 30, through the passage 26,28 and out the vacuum ports 12,14, thereby pressurizing and blowing off the vacuum operated device or tool. When vacuum is to be again applied, the external gas source switches back to the lower, normal operating pressure causing the spring 44 to move the poppet to the left, as viewed in FIG. 2, to close the bypass valve and open the venturi shutoff valve, thereby redirecting the flow to the venturi nozzle passage.

In can be seen that the inventive venturi block and poppet arrangement described provides for a compact, effective means for achieving vacuum termination and positive pressure blowoff effect which minimizes auxiliary piping and controls which are presently required to achieve the same function.

Having described the preferred embodiment of the invention, those skilled in the art having the benefit of that description can readily devise other embodiments and modifications. Therefore, such other embodiments and modifications are to be considered to be within the scope of the appended claims.

What is claimed is:

1. A vacuum venturi device comprising; a body member having a gas inlet, a gas outlet, a passage connecting said gas inlet to said gas outlet, said passage defining venturi means for creating a low pressure area as said gas flows from said gas inlet to said gas outlet in said passage at a predetermined operating inlet pressure, a vacuum port in communication with said low pressure area and means responsive to a predetermined positive inlet pressure in said passage greater than said operating inlet pressure for increasing the pressure at said vacuum port to about said greater predetermined positive inlet pressure.

2. The device as claimed in claim 1 wherein said means for increasing the pressure at said vacuum port to said greater predetermined positive inlet pressure includes a pressure responsive bypass valve in said passage, said bypass valve exposed to said gas inlet, a bypass passage connecting said bypass valve to said vacuum port, said bypass valve adapted to open at said greater predetermined positive inlet pressure thereby diverting at least a portion of said gas at said greater predetermined positive inlet pressure from said passage to at least said vacuum port.

3. The device as claimed in claim 2 wherein said bypass valve is defined by a poppet mounted in said passage having at least a portion of an inlet end face exposed to said gas inlet, and a seal between said inlet end face and said passage, said poppet including a through bore defining a venturi nozzle connecting said gas inlet to said low pressure area.

4. The device as claimed in claim 3 wherein the bypass passage is a clearance space between said poppet and a wall of said passage extending the length of said poppet.

5. The device as claimed in claim 4 wherein said poppet is substantially square.

6. The device as claimed in claim 3 including a compression spring biasing said bypass valve toward a closed position.

7. The device as claimed in claim 6 wherein the area of said inlet end face of said poppet defining said bypass valve and the bias force extended on said poppet by said compression spring are sized such that said bypass valve opens in response to said predetermined positive inlet pressure greater than said predetermined operating inlet pressure.

8. The device as claimed in claim 3 further including a diffuser coaxial to said poppet, the low pressure area located between an inlet end of the diffuser and an end of said poppet at the exit from said nozzle.

9. The device as claimed in claim 8 wherein the end of said poppet at the exit said nozzle and the inlet end of said diffuser define a venturi shutoff valve.

10. A vacuum venturi device comprising; a body member having a gas inlet, a gas outlet, at least one vacuum port, a passage connecting said gas inlet and said gas outlet, venturi means in said passage for creating a low pressure area in said passage during flow of a gas through said passage from said inlet to said outlet at a predetermined gas inlet operating pressure, a vacuum passage connecting said low pressure area to said vacuum port by pass valve means operatively associated with said passage responsive to a predetermined gas inlet pressure greater than said inlet operating pressure for diverting at least a portion of said inlet gas to said at least one vacuum port to raise the pressure at said vacuum port to a positive pressure, and means for disconnecting said low pressure area from said vacuum port substantially simultaneously with the diversion of said inlet gas to said vacuum port.

11. The device as claimed in claim 10 wherein said bypass valve means includes a poppet slidably mounted in said passage and presenting at least a portion of an inlet end face thereof to said gas flow and means associated with said poppet for sealingly closing a bypass channel connected between said passage and said vacuum passage.

12. The device as claimed in claim 11 further including means for biasing said poppet in a direction for sealingly closing said bypass view, said means for biasing adapted to provide for movement of said poppet in a direction to open said bypass valve at said predetermined gas inlet pressure greater than said inlet operating pressure on said inlet end face of said poppet.

13. The device as claimed in claim 11 including a seal carried on said poppet inlet end face sealingly engaging a shoulder on said body around said gas inlet in a closed position of said bypass valve.

14. The device as defined in claim 13 wherein said poppet includes a longitudinal through passage communicating with said gas inlet and defining a venturi nozzle, an outlet from said nozzle being proximate an inlet to diffuser means in said passage for discharging said gas out said gas outlet, an area between said nozzle outlet and said diffuser means inlet defining said low pressure area, said poppet at said nozzle outlet and said diffuser means at said diffuser means inlet defining a venturi shutoff valve operable to close substantially simultaneously with the opening of said bypass valve.

15. A vacuum venturi device comprising, a body member, said body member including, a gas inlet, a gas outlet, a first passage connecting said gas inlet and said gas outlet, a second passage intersecting said first passage defining at least one low pressure port, a poppet in said first passage including a first through passage substantially coaxial to said first passage defining a venturi nozzle having an outlet, a diffuser in said first passage having a second through passage coaxial to said first passage and said first through passage having an inlet, an area between said nozzle outlet and said diffuser inlet defining a venturi low pressure area, said low pressure area in communication with said second passage, a bypass passage connecting said gas inlet to said low pressure area and to said second passage, said poppet defining an inlet gas pressure responsive bypass valve adapted to open said bypass passage at a predetermined inlet gas pressure and a compression spring mounted to bias said bypass valve toward a closed position.

16. The device defined in claim 15 wherein a nozzle exit end of said poppet and an inlet end of said diffuser define a venturi shut off valve, said venturi shut off valve being normally open and adapted to close when said bypass valve opens.

17. The device as claimed in claim 15 further including means for adjusting the bias force of said compression spring exerted on said poppet.

18. The device as claimed in claim 15 wherein said bypass passage is an axial passage extending between opposite ends of said poppet.

19. The device as claimed in claim 18 wherein said poppet is substantially square in cross section.

20. The device as claimed in claim 15 wherein said bypass valve includes seal means on an inlet end face of said poppet sealingly engaging a shoulder of said first passage around said first gas inlet.

* * * * *